Oct. 26, 1948.  V. ZAHLLER  2,452,280
SHOCK ABSORBING SEAT STRUCTURE FOR TRACTORS
Filed Nov. 29, 1944  2 Sheets-Sheet 1
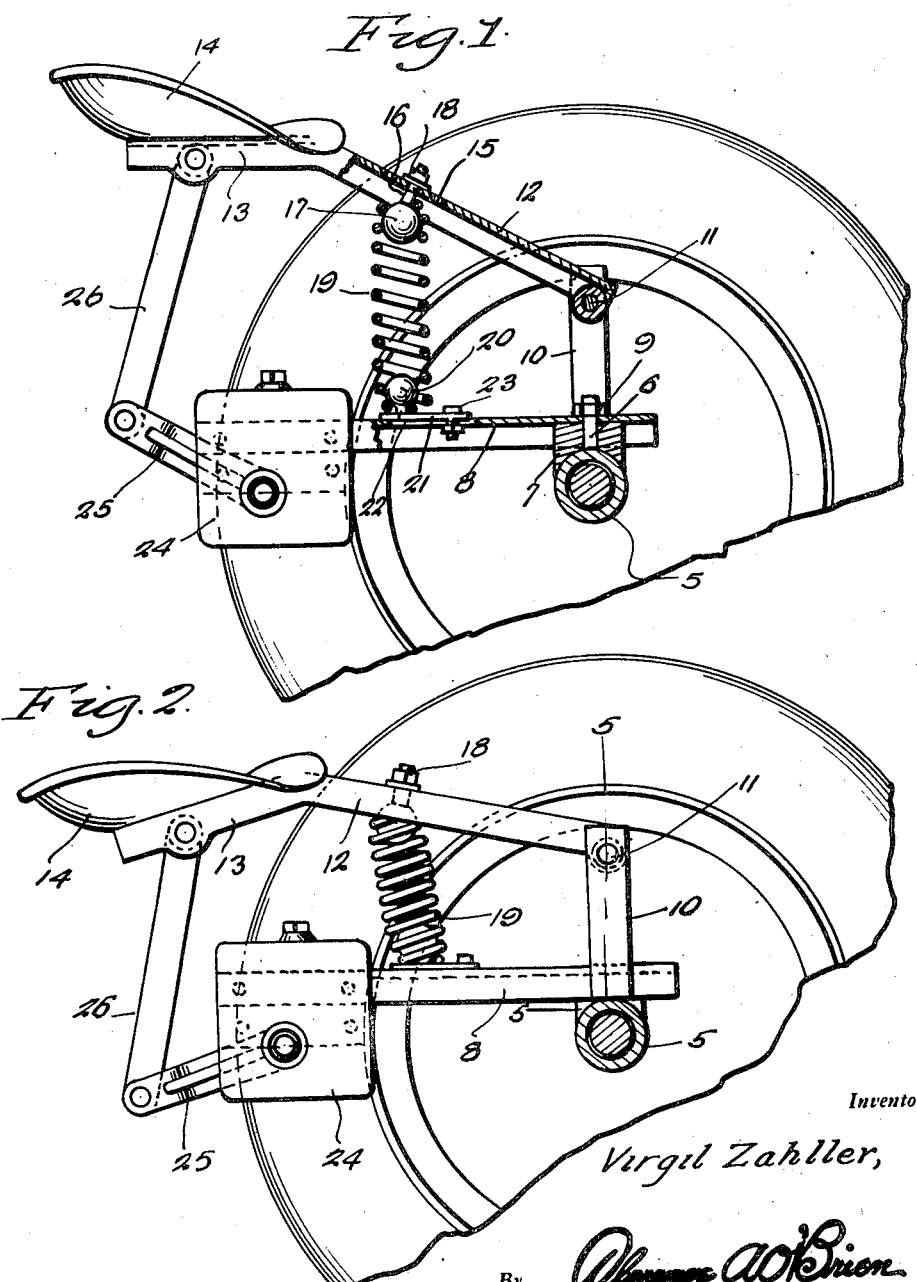
Inventor
Virgil Zahller,

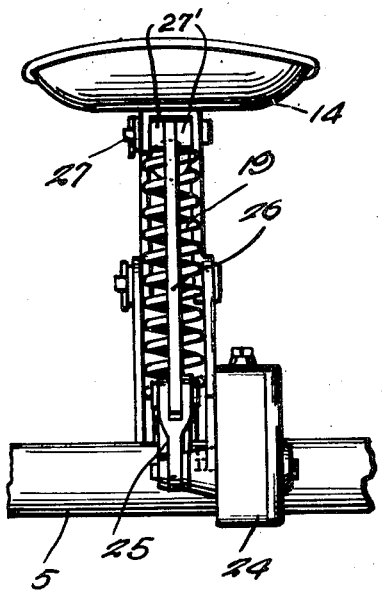
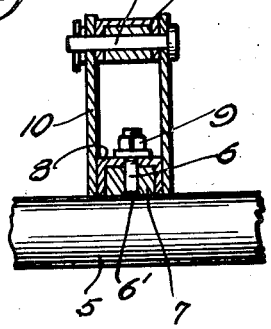
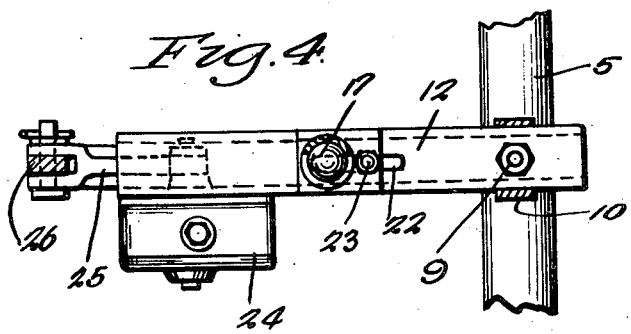

Patented Oct. 26, 1948

2,452,280

UNITED STATES PATENT OFFICE 2,452,280

SHOCK ABSORBING SEAT STRUCTURE FOR TRACTORS

Virgil Zahller, Belle Center, Ohio, assignor to Isaac J. Fickel, Belle Center, Ohio Application November 29, 1944, Serial No. 565,679

1 Claim. (Cl. 155—51)

The present invention relates to new and useful improvements in seat structures for tractors and has for its primary object to provide means for eliminating shock and other sudden movement of the tractor to the seat, such as may be caused by the tractor travelling over rough surfaces.

A further object of the invention is to provide a hydraulic shock absorbing seat structure by means of which sudden raising movement of the seat is eliminated.

A still further object is to provide a structure of this character of simple and practical construction, which is efficient and reliable in performance, relatively inexpensive to manufacture and install in position on a conventional farm tractor and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a tractor seat equipped with my invention and with parts broken away and shown in section.

Figure 2 is a similar view showing the seat in its lower position.

Figure 3 is a rear elevational view.

Figure 4 is a top plan view of the support for the shock absorber and with parts shown in section, and Figure 5 is a sectional view taken substantially on a line 5—5 of Figure 2.

Referring now to the drawings in detail wherein for the purpose of illustration I have disclosed a preferred embodiment of the invention, the numeral 5 designates the rear axle housing of a tractor having a stud 6 rising therefrom, the stud extending upwardly through a block 7 resting on top of the axle housing 5 as shown to advantage in Figures 1 and 5 of the drawings. The stud 6 may be welded to the axle housing 5 as indicated at 6'.

An inverted channel iron support 8 has its front end resting on the block 7 with the stud 6 projecting upwardly through the support and secured thereto by a nut 9.

A pair of posts 10 have their lower ends welded or otherwise suitably secured to the sides of the channel support 8, the posts 10 thus being supported in upright spaced relation and are provided at their upper ends with a pin 11.

Positioned between the posts 10 and pivoted on the pin 11 is an inverted channel member 12, the channel member 12 extending rearwardly and upwardly above the channel support 8, the rear end of the channel member 12 being bent to extend substantially horizontally as shown at 13 and positioned under a seat 14 and suitably secured thereto, such as by welding or the like.

The channel member 12 is formed with a plurality of longitudinally spaced openings 15 adapted for selectively receiving a stud 16 projecting from a ball 17 positioned under the member 12 and secured thereto by a nut 18.

The ball 17 is engaged within and gripped by the upper coil of a coil spring 19 which has its lowermost coil similarly engaging a ball 20 formed on a plate 21 resting on top of the channel support 8. The channel support 8 is formed with a longitudinally extending slot 22 adapted for receiving a bolt 23 carried by the plate 21 for securing the plate in longitudinally adjusted position on the channel support 8. To one side of the channel support 8, adjacent its rear end, is attached a hydraulic shock absorber housing 24 of conventional construction having a movable arm 25 extending rearwardly therefrom and pivotally attached at its outer end to the lower end of a link 26, the link extending upwardly and pivotally attached at its upper end to the horizontal portion 13 of the arm 12 by means of a pin 27 with spacing blocks 27' thereon in said portion and upon opposite sides of said link 26.

In the operation of the device and under normal operating conditions the seat 14 will occupy a position as shown in Figure 1 of the drawings and when the tractor encounters irregularities in the surface of the ground causing an upward movement of the rear end of the tractor the spring 19 will become compressed and the arm 25 of the hydraulic shock absorber will be lowered as shown in Figure 2 of the drawings, thus preventing transmission of the movement of the tractor to the seat. The spring 19 will then have a tendency to expand and raise the seat 14 and any sudden raising movement is retarded by the action of the shock absorber, thus eliminating the transmission of shock to the driver of the tractor.

It is believed that the details of construction and manner of use of the device will be readily understood from the foregoing without further detailed explanation.

Having thus described the invention, what I claim is:

A tractor seat structure for attachment to the axle housing of the tractor comprising an elongated supporting bar, means for attaching said bar at one end thereof to said housing to extend horizontally rearwardly therefrom, a pair of laterally spaced posts arising from said end of said bar, an arm pivoted at one end between said posts to extend rearwardly of said housing along said bar and swing vertically, a seat supported by the other end of said arm, hydraulic shock absorbing means on the other end of said bar including a vertically swingable crank, a link having the ends thereof pivoted to said crank and to said other end of said arm, and an expansion coil spring interposed between said bar and arm intermediate the ends thereof and having its ends connected to said bar and arm for adjustment along the same.

VIRGIL ZAHLLER.

REFERENCES CITED

The following references are of record in the file of this patent:

UNITED STATES PATENTS

| Number | Name | Date |
|---|---|---|
| 74,208 | Dutton | Feb. 11, 1868 |
| 187,542 | Lowth | Feb. 20, 1877 |
| 420,060 | Hanson | Jan. 28, 1890 |
| 666,802 | Ford | Jan. 29, 1901 |
| 1,171,297 | Adams | Feb. 8, 1916 |
| 1,229,488 | Lindskoog | June 12, 1917 |
| 1,288,445 | Seibel | Dec. 17, 1918 |
| 1,426,115 | Shultz | Aug. 15, 1922 |
| 1,663,112 | Caslow | Mar. 20, 1928 |
| 1,961,145 | Harley et al. | June 5, 1934 |
| 2,115,830 | Thiele | May 3, 1938 |
| 2,162,476 | Casper | June 13, 1939 |

FOREIGN PATENTS

| Number | Country | Date |
|---|---|---|
| 382,506 | France | Dec. 10, 1907 |